United States Patent
Krishnamurthy et al.

(10) Patent No.: US 8,537,891 B2
(45) Date of Patent: Sep. 17, 2013

(54) INDEPENDENTLY ADJUSTING THE QUALITY LEVELS FOR LUMINANCE AND CHROMINANCE CHANNELS IN A DIGITAL IMAGE

(75) Inventors: Balaji Krishnamurthy, Delhi (IN); Anubha Rastogi, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 71 days.

(21) Appl. No.: 13/277,110

(22) Filed: Oct. 19, 2011

(65) Prior Publication Data
US 2012/0039543 A1 Feb. 16, 2012

Related U.S. Application Data

(62) Division of application No. 11/445,635, filed on Jun. 2, 2006, now Pat. No. 8,059,712.

(30) Foreign Application Priority Data

Jan. 13, 2006 (IN) .............................. 104/DEL/2006

(51) Int. Cl.
*H04N 7/12* (2006.01)
*H04N 11/02* (2006.01)
*H04N 11/04* (2006.01)

(52) U.S. Cl.
USPC ............ 375/240.02; 375/240.01; 375/240.12; 375/240.15; 375/240.18

(58) Field of Classification Search
USPC ............ 375/240.02, 240.01, 240.12, 240.15, 375/240.18
See application file for complete search history.

(56) References Cited

U.S. PATENT DOCUMENTS

| | | |
|---|---|---|
| 5,247,589 A | 9/1993 | Faul |
| 5,293,252 A | 3/1994 | Kim et al. |
| 5,359,842 A | 11/1994 | Braxmeier et al. |
| 5,398,066 A | 3/1995 | Martinez-Uriegas et al. |
| 5,539,842 A | 7/1996 | Schwartz |
| 5,541,653 A | 7/1996 | Peters et al. |
| 5,748,242 A | 5/1998 | Podilchuk |
| 6,067,120 A | 5/2000 | Horikawa et al. |
| 6,256,347 B1 | 7/2001 | Yu et al. |
| 6,314,136 B1 | 11/2001 | Kilgariff |

(Continued)

OTHER PUBLICATIONS

Roimela, Aarnio and Itatanta, "High Dynamic Range Texture Compression," Nokia Research Center.

(Continued)

*Primary Examiner* — Sath V Perungavoor
*Assistant Examiner* — Geepy Pe
(74) *Attorney, Agent, or Firm* — Wolfe-SBMC

(57) ABSTRACT

A system that compresses a digital image. During operation, the system obtains a digital image in which the image components are de-correlated into separate channels containing luminance information and chrominance information. Next, the system receives a quality number for the luminance channel and a quality number for the chrominance channels, and uses the quality numbers to determine a target bitrate for the luminance channel and for the chrominance channels, respectively. Given the target bitrate for the luminance channel and the target bit rate for the chrominance channels, the system performs rate distortion optimizations separately on the luminance and chrominance channels to determine which portions of the luminance bitstream and which portions of the chrominance bitstream are to be included in the final bitstream. The system then uses the stored rate-distortion information to generate a preview of the digital image without performing entropy coding each time the quality settings are changed.

20 Claims, 2 Drawing Sheets

(56) References Cited

U.S. PATENT DOCUMENTS

| | | |
|---|---|---|
| 6,360,022 B1 | 3/2002 | Lubin et al. |
| 6,650,773 B1 | 11/2003 | Maurer et al. |
| 6,825,876 B1 | 11/2004 | Easwar et al. |
| 7,308,146 B2 | 12/2007 | Becker et al. |
| 7,366,319 B2 * | 4/2008 | Andrew et al. ............... 382/100 |
| 7,463,775 B1 | 12/2008 | Sites |
| 7,505,630 B2 * | 3/2009 | Sakuyama et al. ............ 382/233 |
| 8,059,712 B2 | 11/2011 | Krishnamurthy et al. |
| 2002/0061063 A1 | 5/2002 | Otto |
| 2003/0142864 A1 | 7/2003 | Bezryadin |
| 2003/0202713 A1 | 10/2003 | Sowa |
| 2003/0235339 A1 | 12/2003 | Shin |
| 2004/0131264 A1 | 7/2004 | Sakuyama et al. |
| 2005/0117807 A1 | 6/2005 | Shohdohji |
| 2005/0226513 A1 | 10/2005 | Wallace et al. |
| 2005/0249405 A1 | 11/2005 | Bezryadin |
| 2005/0249406 A1 | 11/2005 | Bezryadin |
| 2007/0165725 A1 | 7/2007 | Krishnamurthy et al. |

OTHER PUBLICATIONS

Xu, R., Parranaik, S.N., and Hughes, C.E., "High Dynamic Range Still-Image Encoding in JPEG2000," IEEE Computer Graphics and Applications, vol. 25, Issue 6, pp. 57-64.

Office Action from U.S. Appl. No. 11/248,878, mailed Jan. 27, 2009.

"Final Office Action", U.S. Appl. No. 11/445,635, (Apr. 14, 2011), 14 pages.

"Non-Final Office Action", U.S. Appl. No. 11/445,635, (Dec. 2, 2010), 17 pages.

"Notice of Allowance", U.S. Appl. No. 11/445,635, (Jun. 28, 2011), 5 pages.

"Restriction Requirement", U.S. Appl. No. 11/445,635, (Sep. 9, 2010), 7 pages.

* cited by examiner

INDEPENDENTLY ADJUSTING THE QUALITY LEVELS FOR LUMINANCE AND CHROMINANCE CHANNELS IN A DIGITAL IMAGE

RELATED APPLICATION

This application is a divisional of U.S. application Ser. No. 11/445,635, filed on Jun. 2, 2006 now U.S. Pat. No. 8,059,712, which hereby claims priority under 35 U.S.C. §119 and/or 365 to Indian Patent Application No. 104/DEL/2006, filed on 13 Jan. 2006, entitled "Independently Adjusting the Quality Levels for Luminance in a Digital Image", by inventors Balaji Krishnamurthy and Anubha Rastogi.

FIELD OF THE INVENTION

The present invention relates to techniques for compressing digital images. More specifically, the present invention relates to a method and an apparatus that facilitates independently adjusting the quality levels for luminance and chrominance channels in a digital image.

Related Art

In recent years, the use of high-resolution digital cameras has increased significantly. Unfortunately, storing raw high-resolution digital images requires large amounts of memory. For example, a 4 mega-pixel digital camera requires up to 12MB of memory to store a raw digital image. However, in most applications, not all of the information in a raw digital image is required. Furthermore, despite the wide-spread adoption of broadband internet connections, transmitting a large digital image still requires a substantial amount of time. Hence, a technique to reduce the size of a digital image is needed.

One technique for reducing the size of a digital image is to use a lossy image compression technique such as JPEG2000. Unfortunately, such lossy compression techniques typically sacrifice some amount of image quality. Consequently, the task of determining what constitutes an acceptable amount of compression loss in a color digital image involves considerable subjectivity. Objective measures such as Mean Square Error (MSE), Peak Signal to Noise Ratio (PSNR), and Perceptual Distortion Metrics do not adequately express the perceived degradation in image quality caused by lossy compression techniques. In these situations, it is desirable for lossy compression systems to allow the user to control the compression process and to preview the compressed image.

Under JPEG2000 compression, a "target bitrate" is typically used to control the compression process. To this end, a Post-Compression Rate-Distortion (PCRD) technique is often used to produce a bitstream of the desired size with the least possible distortion for the given target bitrate. A number of distortion measures can be used, such as MSE, or a weighted MSE, which takes perceptual distortion into account. Typically the weights used in such perceptual distortion metrics are hard-coded inside an image-processing program and are not available for the user to manipulate. Even if such weights could be controlled by the user, the controls would be rather complicated and non-intuitive to use.

Hence, what is needed is a method and an apparatus for controlling image quality when compressing a digital image without the above-described problems.

SUMMARY

One embodiment of the present invention provides a system that compresses a digital image. During operation, the system obtains a digital image in which the image components are de-correlated into separate channels containing luminance information and chrominance information. Next, the system receives a quality number for the luminance channel and a quality number for the chrominance channels. (Note that the system receives the quality number for the luminance channel and chrominance channels from a user.) The system then uses the quality number for the luminance channel to determine a target bitrate for the luminance channel, and uses the quality number for the chrominance channels to determine a target bitrate for the chrominance channels. Given the target bitrate for the luminance channel and the target bit rate for the chrominance channels, the system performs rate-distortion optimizations separately on the luminance and chrominance channels to determine which portions of the luminance bitstream and which portions of the chrominance bitstream are to be included in the final bitstream.

In a variation on this embodiment, prior to performing the rate-distortion optimizations, the system performs a discrete wavelet transform separately on the luminance channel and the chrominance channels. Next, the system quantizes the discrete wavelet transform coefficients using small-valued quantizers. The system then partitions the digital image into small code blocks and applies entropy coding to each code block to generate bitstreams for the luminance channel and the chrominance channels.

In a variation on this embodiment, while applying entropy coding to each code block, the system generates information about the compressed length and the distortion for each pass of the embedded block coding with optimal truncation for each code block. The system then stores rate-distortion information specifying the compressed length and distortion for each code block into a table.

In a variation on this embodiment, while determining which parts of the luminance bitstream and which parts of the chrominance bit streams are to be included in the final bitstream, the system applies the rate-distortion optimization to the luminance channel and the chrominance channels separately using the stored rate-distortion information.

In a variation on this embodiment, the system generates a preview of the digitized image as follows. The system uses the stored rate-distortion information to select bitplanes to include in the digital image. Next, the system removes unneeded bit planes for each code block. The system then performs an inverse wavelet transform on the processed digital image. Next, the system performs an inverse de-correlating transform and displays the compressed digital image. The system then reports an accurate prediction of the compressed file size. Note that entropy coding is not performed each time the quality settings are changed. This substantially reduces the amount of time required to create a preview of the image for a given quality setting. After a user determines that the selected quality setting is satisfactory, the compressed data for the digital image is saved.

In a variation on this embodiment, if a low resolution preview is desired, the bitplanes for only those sub-bands that correspond to the desired resolution are discarded, and the inverse wavelet transform is performed only to the desired resolution-level.

In a variation on this embodiment, the system generates a preview of the luminance channel only by using the stored rate-distortion information of the luminance channel for the received luminance quality number to determine which bitplanes of the luminance channel to discard. Next, the system discards the unneeded bitplanes from each code block of the luminance channel. The system then de-quantizes the processed digital image, performs an inverse wavelet transform on the de-quantized digital image, and displays the preview of the digital image containing only the luminance channel information.

In a variation on this embodiment, the quality numbers for the luminance and chrominance channels are mapped to fractions of a maximum raw bit stream size of the respective channel.

In a variation on this embodiment, the luminance and the chrominance quality numbers for a given region of the digital image can be set independently of the luminance and the chrominance quality numbers for other regions of the digital image.

In a variation on this embodiment, the system uses the quality number for the luminance channel to determine a target bitrate for the luminance channel corresponding to a given region of the digital image. Next, the system uses the quality number for the chrominance channels to determine a target bitrate for the chrominance channels corresponding to the given region of the digital image. The system then performs rate distortion optimization on the luminance channel and the chrominance channels corresponding to the given region to determine which parts of the luminance channel and which parts of the chrominance channel corresponding to the given region are to be included in the final bitstream.

In a variation on this embodiment, the quality numbers for the luminance and the chrominance channels for the given region of the digital image are mapped to fractions of the maximum bitstream size of the respective channels corresponding to the given region.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 2:
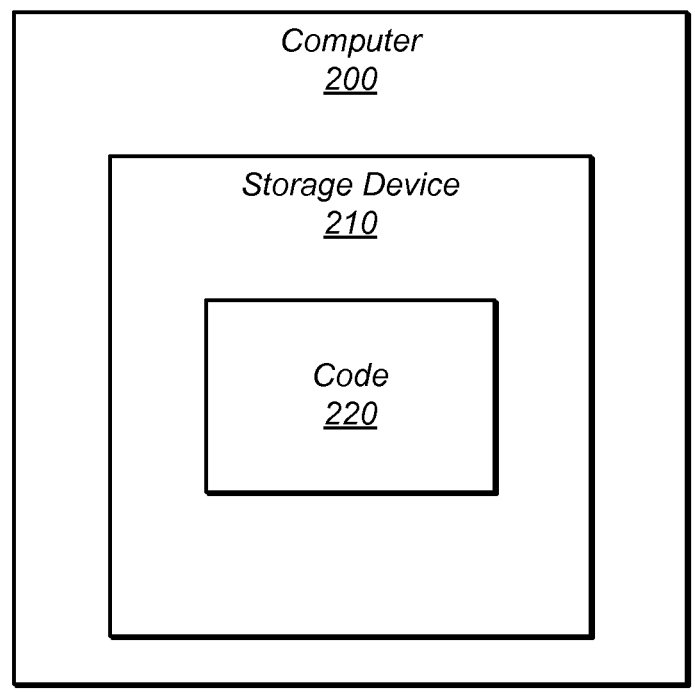
FIG. 2 presents a block diagram showing a device or non-transitory computer-readable storage medium storing code for compressing a digital image.

As shown in FIG. 2, the data structures and code 220 described in this detailed description are typically stored on a computer-readable storage medium, which may be any device or medium 230 that can store code and/or data for use by a computer system 200. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Quality Numbers for Luminance and Chrominance Channels

The present invention provides a mechanism to separately vary the bitrate allocated to the luminance channel (image features) and the chrominance channels (color information) of a compressed digital image. This mechanism can be coupled with a preview mechanism so that a user can subjectively determine which settings produce the best possible image for a given bit-budget.

Given a target bitrate, the PCRD technique is used to minimize the overall distortion for all the channels for the given bitrate. For low bitrates, the PCRD technique can produce fuzzy looking color images. A user may want to trade off some color information for more image sharpness or vice-versa. Even at medium and high bitrates the user may want more or less features in lieu of color information so that the subjective perception of image quality is improved. The present invention enables the user to make these tradeoffs to improve the perceived image quality.

Note that in case of a single component image (grayscale, for example), the MSE metric (or a weighted MSE metric) is a reasonable indicator of image quality. Also note that most of the images compressed in JPEG2000 undergo a de-correlating transform which separates the luminance information (image features) from the chrominance (color) information. Furthermore, note that the human eye is generally more sensitive to luminance information than chrominance information within an image.

"Quality numbers" for the luminance channel and the chrominance channels correspond to fractions of the maximum possible raw bitstream size of the respective channels. These quality numbers can be set independently for the luminance and chrominance channels. The PCRD technique is then applied to the luminance channel and the chrominance channels separately. The information output by the PCRD technique is used to provide a preview of the digital image.

In one embodiment of the present invention, a separate preview of the luminance information is provided so that the user can determine the acceptable amount of image-feature loss. In this way, the user can first select a luminance quality number with the assistance of the luminance preview mechanism, and can then switch to the full image preview mechanism to select the chrominance quality number to add just enough color information to make the overall image quality acceptable.

In one embodiment of the present invention, the system uses a standard PCRD technique to minimize MSE for all channels. The user then fine tunes the amount of luminosity and color information using the quality numbers and the preview mechanism.

In one embodiment of the present invention, the quality numbers are fractions of the total bitstream size for the channels. These quality numbers provide the user with the ability to control the proportions of luminance information and chrominance information in the final bitstream. A separate luminance preview mechanism and a full image preview mechanism aid in selecting the proper quality numbers for the luminance channel and the chrominance channels, respectively.

In cases where the PCRD technique is not performed and scalar quantization is used to control compression quality, the user can select the quantizers for the luminance channel and chrominance channels separately, making use of the luminance preview and the full image preview.

Note that in cases where PCRD is not performed, the file size of the compressed image cannot be predicted, but the preview of the image is still accurate (for example, when PCRD is not performed and scalar quantization is used instead).

Generating a Preview of a Digital Image

The present invention provides a fast and accurate preview mechanism which facilitates fine control of the visual quality. This preview mechanism also accurately reports the final compressed file size for given quality numbers for the luminance channel and the chrominance channels.

Note that in order to generate an accurate preview and to provide the user the exact compressed file size, a typical technique is to compress and decompress the digital image. Unfortunately, this compression-decompression process is extremely slow. Note that the present invention does not perform decompression or compression when generating such previews and compressed file sizes.

Figure 1:
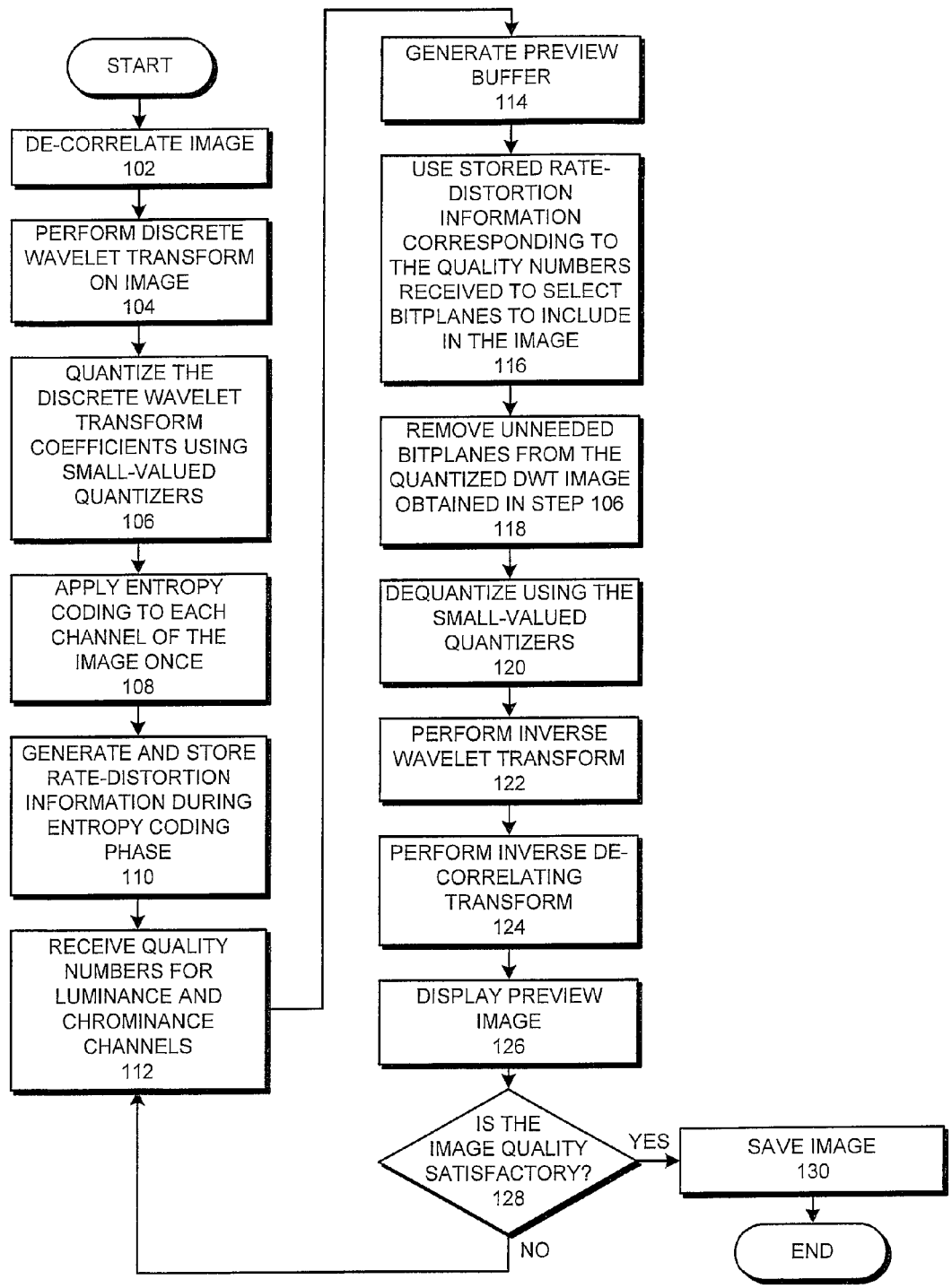
FIG. 1 presents a flow chart illustrating the process of generating a preview of a digital image in accordance with an embodiment of the present invention.

FIG. 1 presents a flow chart illustrating the process of generating a preview of a digital image in accordance with an embodiment of the present invention. If the digital image is in a color-space that requires de-correlation to achieve efficient compression (for example an RGB image), the system first applies a de-correlating transform to the digital image and the digital image is converted to a luminance-chrominance color-space (step 102). For example, the three component transform specified in the JPEG2000 standard coverts an image in an R-G-B color-space to an image in a Y-Cb-Cr color-space. The Y channel in the Y-Cb-Cr color-space corresponds to the luminosity and carries the most perceptual information of all channels in the Y-Cb-Cr color-space. The Cb and Cr channels contain the chrominance (color) information and hence carry less significant perceptual information. Note that if the image is in a color-space that is already de-correlated, for example LAB or SYCC color-spaces, the de-correlating transform does not have to be applied and the luminance channel and the chrominance channels can be used directly.

Next, the system performs a discrete wavelet transform (DWT) on the luminance channel and the chrominance channels (step 104). The DWT decomposes the digital image into wavelet-transform coefficients. These coefficients are typically grouped into individual sub-bands depending upon the frequency and the spatial orientation of the coefficients.

The system then quantizes the coefficients of the discrete wavelet transform using small-valued quantizers (step 106), thus preserving the maximum amount of information about the image. Also note that the system partitions the digital image into small rectangular code blocks prior to entropy coding.

Next, the system applies the JPEG2000 entropy coding technique once to produce a bit stream $B_{max}$, of total length $S_{max}$ (step 108). Note that the quantizers are chosen so that the loss in image quality is minimal. Also note that decoding this bitstream results in a very high quality digital image. Furthermore, the system assigns a positive integer $Q_{max}$ to represent the quality number corresponding to $B_{max}$. Moreover, if sufficient memory is available, the DWT coefficients are stored.

During the encoding process, the system generates information about the compressed length and the distortion for each Embedded Block Coding with Optimal Truncation (EBCOT) pass for each code block and stores this information in a structure called RDHull (step 110). Note that step 110 is performed only once and is not repeated each time the quality number is changed.

Note that the luminance contribution of $B_{max}$ is $B_{lum}$ with length $S_{lum}$, and the chrominance contribution is $B_{chr}$ with length $S_{chr}$. The maximum quality numbers for the luminance and chrominance channels are the positive numbers $Q_{lum}$ and $Q_{chr}$ respectively.

Quality numbers for the luminance channel are defined such that quality number $0 < ql \leq Q_{lum}$ corresponds to a rate-distortion optimized bitstream of length $Tql = (ql/Q_{lum})*S_{lum}$.

Similarly for the chrominance channels, quality numbers are defined such that quality number $0 < qc \leq Q_{chr}$ corresponds to a rate-distortion distortion optimized bit stream of length $Tqc = (qc/Q_{chr})*S_{chr}$.

The process in FIG. 1 continues when the system receives a quality number pair (ql, qc) and supplies the target bitrates (Tql, Tqc) to the PCRD optimizer (step 112).

Next a preview buffer is created (step 114) in the following way: If the quantized DWT coefficients from step 106 have been stored, the system creates a copy of the stored coefficients. Otherwise, the system performs the DWT and quantization as per step 106.

The PCRD optimizer then performs rate-distortion optimization separately on the luminance channel and the chrominance channels using the stored rate-distortion information to determine which parts of the encoded luminance bitstream ($B_{lum}$) and which parts of the encoded chrominance bitstream ($B_{chr}$) need to be included in the final bit stream (step 116). This optimization process determines which EBCOT passes, and hence which bitplanes, are to be included for each code block. Next, the system discards the unneeded bitplanes of each code block from the preview buffer generated in step 114 (step 118).

Note that each bitplane gives rise to a fixed number of EBCOT passes: one pass if it is the first bitplane, and three passes for other bitplanes.

Next, the system de-quantizes the image using the small-valued quantizers used in step 106 (step 120). The system then performs an inverse wavelet transform on the image (step 122), followed by an inverse de-correlating transform (step 124). Note that the inverse de-correlating transform is needed when processing a digital image which was originally in a correlated color-space. In one embodiment of the present invention, the preview generation process generates a preview of the luminosity channel only.

The system then displays the preview of the digital image for the selected quality number (step 126). If the image quality is satisfactory (step 128), the system saves the image (step 130). Otherwise, the process returns to step 112.

Note that the system determines the size L_(ql, qc) of the bit stream corresponding to the quality pair (ql, qc) using the length information for each coding pass stored in the RDHull structure generated during PCRD optimization. Since the discrete wavelet transform, entropy coding, and entropy decoding are decoupled from the preview generation process, each time the user selects a quality value pair, the system performs only the DWT, the PCRD optimization, and the inverse wavelet transform. If the DWT coefficients are stored, the DWT step is not needed. Note that entropy coding/decoding is completely eliminated from the preview-generation process and instant feedback on the image size and image compression losses are provided.

In one embodiment of the present invention, sliders in a user interface can be used to select the quality numbers for the luminance channel and the chrominance channels. These sliders allow the user to intuitively control the bitrates of the luminance channel and the chrominance channels, and to subjectively generate the best possible compressed image for a given bit-budget.

In cases where PCRD is not performed and scalar quantization is used to control compression quality, the system maps the quality numbers ql and qc to appropriate sets of quantizers of the wavelet sub-bands and allows the user to select the quantizers for the luminance channel and the chrominance channels separately.

Note that in cases where PCRD is not performed, the file size of the compressed image cannot be predicted, but the preview of the image is still accurate (for example, when PCRD is not performed and scalar quantization is used instead).

In this case, the preview generation process operates as follows. The luminance channel is first subjected to a discrete wavelet transform, and is quantized using the selected quantizer. Next, the result is de-quantized before being displayed. For the full image preview, all of the channels are subjected to this process and an inverse de-correlating transform is applied (if necessary) to generate the preview image.

In one embodiment of the present invention, the above-described image-compression technique is used to compress individual video frames. Since the file size is fixed, the user only needs to adjust the quality. Note that the quality settings can be reused for a range of frames.

In one embodiment of the present invention, a preview of the luminance channel only is generated by using the stored rate-distortion information of the luminance channel for the received luminance quality number to determine which bitplanes of the luminance channel to discard. Next, the unneeded bitplanes are discarded from each code block of the luminance channel. The processed digital image is then de-quantized, an inverse wavelet transform is performed on the de-quantized digital image, and the preview of the digital image containing only the luminance channel information is displayed.

In one embodiment of the present invention, if a low resolution preview is desired, the system determines which bitplanes to discard for only those sub-bands that correspond to the desired resolution. Note that code blocks belonging to sub-bands that do not contribute to the desired resolution are discarded. Also note that the system performs the inverse wavelet transform only to the desired resolution-level. Also note that this is true both when using PCRD and when using scalar quantization.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for compressing a digital image, comprising:
   receiving selected quality numbers from a user;
   mapping the selected quality numbers to sets of quantizers of wavelet sub-bands; and
   generating a luminance preview of the digital image for the selected quality numbers by:
      applying a discrete wavelet transform to a luminance channel of the digital image;
      quantizing discrete wavelet transform coefficients based on the selected quality numbers;
      storing the discrete wavelet transform coefficients; and
      generating rate-distortion information during entropy encoding the transformed digital image using the mapped quantizers, the mapped quantizers chosen to minimize loss of image quality;
      storing the rate-distortion information from the generating rate distortion information during the entropy encoding;
      creating a preview buffer for the luminance preview of the digital image using the stored discrete wavelet transform coefficients;
      performing rate-distortion optimization on the encoded luminance preview of the digital image in the preview buffer, the performing creating one or more bitplanes;
      discarding unneeded bitplanes created during the performing rate-distortion optimization;
      dequantizing the luminance preview of the digital image using the stored discrete wavelet transform coefficients;
      transforming the luminance preview of the digital image with an inverse wavelet transformation; and
      displaying the luminance preview of the digital image.

2. The method of claim 1 further comprising:
   responsive to a user deciding the digital image is satisfactory, saving the digital image.

3. The method of claim 1 further comprising:
   responsive to a user deciding the digital image is not satisfactory:
      receiving new quality numbers from the user;
      creating the preview buffer for the luminance preview of the digital image using the stored discrete wavelet transform coefficients;
      performing the rate-distortion optimization on the encoded luminance preview of the digital image in the preview buffer, the performing creating the one or more bitplanes;
      discarding the unneeded bitplanes created during the performing rate-distortion optimization;
      dequantizing the luminance preview of the digital image using the stored discrete wavelet transform coefficients; and
      transforming the luminance preview of the digital image with the inverse wavelet transformation.

4. The method of claim 1 further comprising:
   responsive to the digital image being a correlated digital image, transforming the image with a de-correlating transform to convert the digital image to a luminance-chrominance color-space, before the applying the discrete wavelet transform to the luminance channel of the digital image.

5. The method of claim 4 further comprising:
   responsive to the digital image being a correlated digital image, performing an inverse de-correlating transform after the transforming the luminance preview of the digital image with the inverse wavelet transformation.

6. The method of claim 1, wherein the quality numbers are mapped to fractions of a maximum raw bit stream size.

7. The method of claim 1, wherein the received selected quality numbers quality are selected by the user by adjusting slider controls in a user interface.

8. The method of claim 1, wherein the selected quality numbers for a given region of the digital image are set independently from quality numbers for other regions of the digital image.

9. The method of claim 1, wherein if a low resolution luminance preview image is desired, the inverse wavelet transform is performed only to the desired resolution level.

10. The method of claim 1, further comprising:
    if there is insufficient memory to store the discrete wavelet transform coefficients from the discrete wavelet transform of the luminance channel of the digital image, the creating the preview buffer for the luminance preview of the digital image further comprises:
       applying a discrete wavelet transform to the luminance channel of the digital image; and
       quantizing the discrete wavelet transform coefficients based on the selected quality number.

11. One or more tangible computer-readable storage media comprising instructions, executable by one or more processors to cause the one or more processors to implement a method for compressing a digital image, comprising:
    receiving selected quality numbers from a user;
    mapping the selected quality numbers to sets of quantizers of wavelet sub-bands;
    generating a luminance preview of the digital image for the selected quality numbers by:
        applying a discrete wavelet transform to a luminance channel of the digital image;
        quantizing discrete wavelet transform coefficients based on the selected quality numbers;
        storing the discrete wavelet transform coefficients;
        generating rate-distortion information during entropy encoding the transformed digital image using the mapped quantizers, the mapped quantizers chosen to minimize loss of image quality;
        storing the rate-distortion information from the generating rate distortion information during the entropy encoding;
        creating a preview buffer for the luminance preview of the digital image using the stored discrete wavelet transform coefficients;
        performing rate-distortion optimization on the encoded luminance preview of the digital image in the preview buffer, the performing creating one or more bitplanes;
        discarding unneeded bitplanes created during the performing rate-distortion optimization;
        dequantizing the luminance preview of the digital image using the stored discrete wavelet transform coefficients;
        transforming the luminance preview of the digital image with an inverse wavelet transformation; and
        displaying the luminance preview of the digital image.

12. The one or more tangible computer-readable storage media of claim 11, the instructions further comprising:
    responsive to a user deciding the digital image is satisfactory, saving the digital image.

13. The one or more tangible computer-readable storage media of claim 11, the instructions further comprising:
    responsive to a user deciding the digital image is not satisfactory:
        receiving new quality numbers from the user;
        creating the preview buffer for the luminance preview of the digital image using the stored discrete wavelet transform coefficients;
        performing the rate-distortion optimization on the encoded luminance preview of the digital image in the preview buffer, the performing creating the one or more bitplanes;
        discarding the unneeded bitplanes created during the performing rate-distortion optimization;
        dequantizing the luminance preview of the digital image using the stored discrete wavelet transform coefficients; and
        transforming the luminance preview of the digital image with the inverse wavelet transformation.

14. The one or more tangible computer-readable storage media of claim 11, the instructions further comprising:
    responsive to the digital image being a correlated digital image, transforming the image with a de-correlating transform to convert the digital image to a luminance-chrominance color-space, before the applying the discrete wavelet transform to the luminance channel of the digital image.

15. The one or more tangible computer-readable storage media of claim 14, the instructions further comprising:
    responsive to the digital image being a correlated digital image, performing an inverse de-correlating transform after the transforming the luminance preview of the digital image with the inverse wavelet transformation.

16. The one or more tangible computer-readable storage media of claim 11, wherein the quality numbers are mapped to fractions of a maximum raw bit stream size.

17. The one or more tangible computer-readable storage media of claim 11, wherein the received selected quality numbers quality are selected by the user by adjusting slider controls in a user interface.

18. The one or more tangible computer-readable storage media of claim 11, wherein the selected quality numbers for a given region of the digital image are set independently from quality numbers for other regions of the digital image.

19. The one or more tangible computer-readable storage media of claim 11, wherein if a low resolution luminance preview image is desired, the inverse wavelet transform is performed only to the desired resolution level.

20. The one or more tangible computer-readable storage media of claim 11, the instructions further comprising:
    if there is insufficient memory to store the discrete wavelet transform coefficients from the discrete wavelet transform of the luminance channel of the digital image, the creating the preview buffer for the luminance preview of the digital image further comprises:
        applying a discrete wavelet transform to the luminance channel of the digital image ; and
        quantizing the discrete wavelet transform coefficients based on the selected quality number.

* * * * *